2,768,154

URETHANE MODIFIED MATERIALS

Cornelius C. Unruh and Albert C. Smith, Jr., Rochester, N. Y., assignors to Eastman Kodak Company, Rochester, N. Y., a corporation of New Jersey No Drawing. Application October 12, 1953, Serial No. 385,718

8 Claims. (Cl. 260—73)

This invention relates to organic compounds having functional hydroxyl groups replaced by urethane derivatives and is particularly concerned with urethane modified polymers.

Hydroxylated compounds, such as the glycols and particularly the hydroxy containing polymers, have been modified with certain alkyl and aryl isocyanates to give the corresponding urethanes. These products however, are generally characterized by being hydrophobic in nature and are consequently limited in their application particularly in the fields where hydrophilic compounds are necessary. Thus for example, in the manufacture of photographic products and in the making of emulsions of various kinds, materials are used which are either partially or wholly water soluble for many applications, gelatin being a typical material of this nature.

It is accordingly an object of this invention to provide new and useful hydrophilic materials and new and improved methods of making such materials.

It is another object of this invention to provide a new method of modifying materials containing at least one functional hydroxyl group and particularly for modifying materials containing a plurality of such hydroxyl groups, as in the case of many polymeric organic compounds.

It is another object of the invention to convert hydroxyl containing polymers to new and useful urethane polymeric derivatives.

It is also an object of this invention to provide certain new and useful hydrohilic materials suitable for use as gelatin replacements and as emulsion extenders or addenda.

Another object of the invention is to modify hydroxyl containing polymers such as cellulose esters, polyvinyl alcohols, and the like, to introduce hydrophilic groups into the polymer structure capable of increasing the water solubility of such polymers.

Another object of the invention is to provide a simple but effective method of preparing urethane carboxylates, the corresponding urethane carboxylic acids, and carbamido urethanes.

Other objects will be apparent from the description and claims which follow.

These and other objects are attained by means of this invention as described in detail hereinafter with particular reference to certain perferred embodiments thereof. We have found that organic compounds containing at least one functional hydroxyl group can be reacted with an isocyanocarboxylate of the formula:

$$O=C=N-R-COOR'$$

wherein R and R' are either alkyl, aryl, or aralkyl groups to form urethane carboxylates wherein the functional hydroxyl groups, at least in part, are converted to groups of the formula:

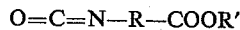

and that these urethane carboxylates can thereafter be hydrolyzed under acid or alkaline conditions to give the corresponding urethane carboxylic acids or reacted with a nitrogenous material containing a hydrogen group, such as ammonia, primary or secondary amines, to give the corresponding carbamido urethanes characterized by the group:

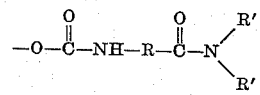

in the positions normally occupied by hydroxyl groups. The hydroxyl-containing organic compounds are readily modified in this manner and the resulting products find utility particularly in the photographic field and in other related and unrelated fields, in view of their increased hydrophilic nature.

In practicing this invention any of the well known organic compounds containing at least one functional hydroxyl group can be modified in accordance with the invention. Thus for example any of the materials containing alcoholic or phenolic hydroxyl groups are within the scope of the invention. Such materials can include water, the low molecular weight alcohols, glycols, such as propylene glycol, ethylene glycol, and the like, as well as the hydroxyl containing polymeric carbohydrate materials such as the partial cellulose esters and ethers and the hydroxyl-containing polymers containing a plurality of recurring alkylene groups such as the partially hydrolyzed polyvinyl polymers, polyvinylidene polymers and the like. The invention is of particular importance in modifying the properties of the polymeric materials containing a substantial portion of reactive hydroxyl groups. Typical of the polymeric materials which are modified in accordance with this invention are the partial cellulose esters, such as cellulose acetate, cellulose butyrate, and mixed cellulose esters containing functional hydroxyl groups; partial cellulose ethers such as cellulose ethyl ether, cellulose methyl ether, and the like; methyl cellulose, ethyl cellulose, hydroxy ethyl cellulose and the like; polyvinyl alcohol; partially esterified polyvinyl alcohols such as those containing a substantial amount of polyvinyl acetate, polyvinyl acetal and similar well known polymeric materials such as vinylacetate-ethylene polymers.

These hydroxyl containing organic compounds are reacted with an isocyanocarboxylate to give a urethane carboxylate wherein at least a portion of the functional hydroxyl groups of the organic compound are converted to groups of the formula:

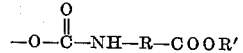

Any of the isocyanocarboxylates of the formula:

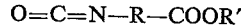

wherein R and R' are either unsubstituted or substituted alkyl, aryl and aralkyl groups are suitably employed. Thus, the esters of isocyano aliphatic acids and isocyano aromatic acids can both be employed. The particular nature of the carboxylate group is not of importance in affecting the course of the reaction. Thus, for example, the esters of isocyanoacetic acid and those of p-isocyanobenzoic acid can be used with similar results. The esters of the isocyanocarboxylic acids can be prepared in any of the well known ways as, for example, by the methods described in Comptes rendu, vol. 143, p. 119 (1906), and Annalen, vol. 562, p. 105, 107 (1949).

For example, the isocyanocarboxylate, ethyl isocyanoacetate, was prepared in the following manner:

A mixture of 500 g. of dry glycine ethyl ester hydrochloride and 1000 ml. of dry toluene was placed in a 3-necked 2-l. flask fitted with a heating mantle, reflux condenser and a gas inlet tube. The mixture was heated and stirred until the toluene began to reflux at which time a stream of phosgene was bubbled into the mixture. After a period of 1 to 2 hours, solution was complete with a very small amount of tar being formed. The light brown solution was then distilled under a slight vacuum until the toluene had distilled off and thereafter the ethyl isocyanoacetate was distilled off in a yield in excess of 90% at about 65° C. and 10 mm. pressure.

The aromatic isocyanocarboxylate, methyl 4-isocyanobenzoate, was prepared in a similar manner. In this case, 750 g. of phosgene was added to 1500 ml. of dry chlorobenzene with the solution being cooled during mixing. With the solution maintained at 0° C., 370 g. of finely powdered methyl p-aminobenzoate was slowly added while the solution was being stirred. The resulting mixture was allowed to stand overnight at room temperature and thereafter heated slowly to 70° C. at which time a slow stream of phosgene was introduced. The temperature was then increased to 90° C. and held at that temperature until a clear solution was obtained. The temperature was then raised to 130° C. and held for a short time to insure complete evolution of unreacted gas. The resulting reaction mixture was then fractionated and 360–370 g. of methyl 4-isocyanobenzoate having a melting point of 49–50° C. was distilled off at 122–124° C. and 11 mm. pressure. The corresponding ethyl ester was obtained in a similar manner employing 405 g. of ethyl p-aminobenzoate in place of the methyl ester. Other suitable isocyanocarboxylates such as the caproates can be prepared in like manner and isocyanates can be derived from esters of other amino acids such as alanine or leucine esters and the like.

The reaction between the hydroxyl containing organic compound and the isocyanocarboxylate is preferably effected under substantially anhydrous conditions. When one of the reactants is a liquid, the reaction can be effected in a solution of such reactants or the reaction can be effected in a suitable solvent such as pyridine, dioxane, acetone, or the like. The reaction is usually promoted by the use of slightly elevated temperatures, such as temperatures of from about 50° C. to about 100° C., although higher or lower temperatures can be employed depending upon the reactants and the desired reaction time. The relative proportions of the reactants can, of course, be varied as desired depending upon the degree of modification which is desired. Thus for example equivalent molar proportions of the hydroxylated material and the isocyanocarboxylate can be used or amounts of one mole of one reactant to as much as 10 moles of the other reactant or more can be used with satisfactory results. The reaction can be effected in batchwise manner or in a continuous process in accordance with well known chemical practice as desired.

The urethane carboxylates thus formed and containing a substantial amount of substituent groups of the formula:

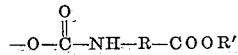

are suitably employed as carriers for the photosensitive silver halide emulsions used in the photographic industry or for use as extenders or addenda in these or other emulsions wherein hydrophilic organic compounds are desired. The products can be cast into continuous films from solution in a suitable solvent in accordance with well known practice or can be employed for making molded products or fibrous materials particularly in the case of the modified polymeric products.

In some cases it is desirable to further modify the chemical structure and properties of the urethane carboxylates by hydrolyzing them to the corresponding urethane carboxylic acids. This is readily accomplished in accordance with this invention by treating such urethane carboxylates with an acid or an alkaline material such as the alkali metal and alkaline earth hydroxides. The hydrolysis proceeds readily at low concentrations of the base, as for example, at 1 N. concentrations of such alkaline materials as sodium hydroxide, potassium hydroxide, and the like. The hydrolysis is effected in aqueous media or in alcohol and desirably, although not necessarily, the reaction mixture is heated at from 40 to 100° C. to promote the course of the hydrolysis. In this manner, the carboxylate esters are hydrolyzed to the corresponding carboxylic acids without otherwise affecting the structure of the compound. The hydrolyzed product can be isolated as a salt or as the free carboxylic acid upon acidification of the salt. These urethane carboxylic acids or their salts are even more hydrophilic in most cases than are the corresponding esters from which they were formed. Water soluble salts of the acids are readily prepared in the usual manner and such salts as the sodium salt or the like possess a very high degree of water solubility. By controlling the proportions of the reactants as well as the reaction conditions, materials having any desired degree of carboxylation can be obtained. The urethane carboxylic acids thus prepared, particularly in the case of the modified polymeric materials, find utility as gelatin replacements or as addenda to carriers of photosensitive materials. Those polymers which are completely soluble in alkaline media find use as removeable backings for photographic films.

In some cases it is desirable to modify the urethane carboxylates by converting them to the corresponding carbamido urethanes in accordance with this invention. This is readily effected by reacting any of the urethane carboxylates, as described hereinabove, with a nitrogenous compound containing at least one reactive hydrogen. Such nitrogenous compounds include ammonia and the primary and secondary amines such as piperidine, morpholine, n-butylamine, methyl amine, ethyl amine, dimethyl amine, benzylamine, and any of the other well known aliphatic or aromatic amines including the aryl, alkyl and aralkyl amines. Other suitable nitrogenous compounds include the monoamino dyes, couplers, reducing agents, ultra-violet absorbers, mordants, and similar nitrogenous materials containing an active hydrogen group as well as substituted amines such as hydrazine and hydrazino derivatives or even the hydroxy amino compounds. By reaction of the urethane carboxylate with such nitrogenous compounds in accordance with this invention, carbamido urethanes containing the group:

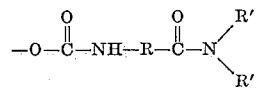

are obtained.

The reaction conditions under which the carbamido urethanes are prepared can be varied as desired and in accordance with well known chemical practice. Thus, for example, the reaction can be carried out either batchwise or in a continuous process and employing one of the reactants as the reaction medium or using a suitable inert solvent. The reaction times and temperatures can be varied depending upon the nature of the reactants, the desired degree of modification, and the relative proportions of the reactants. In many cases, the reaction can be allowed to proceed at room temperature; although elevated temperatures, such as temperatures up to 100° C. or higher, can be employed particularly where it is desired to reduce the total reaction time. The ammonia can be used in the form of a gas which is added to the reaction mixture or it can be added in the form of aqueous ammonium hydroxide. The resulting products, as in the case of those described hereinabove, can be used for a variety of purposes including emulsion addenda, molding compounds, textile-treating materials, and fiber-forming polymers as desired.

The invention is illustrated by the following examples of preferred embodiments thereof which are included for purposes of illustration and which are not intended to limit the scope of the invention as described and claimed unless otherwise specifically indicated. The polymeric products embodying the invention can be used as carriers for silver halides in photographic film and also as supporting layers on film bases in the manufacture of photosensitive materials.

Example 1

A mixture of 10 g. of polyvinyl alcohol and 100 ml. of dry pyridine was heated overnight on a steam bath. Thereafter, while the mixture was being stirred, a total of 40 g. of ethyl isocyanoacetate was added in 4 equal portions during a period of 30 minutes. The polymer particles swelled and occupied the entire liquid volume and after heating for 2 hours on a steam bath, a smooth, clear, yellow solution free of graininess was obtained. This was thinned with 100 ml. of acetone and poured into 3 l. of water. The soft, white, rubbery precipitate thus obtained was redissolved in acetone and again poured into water. This procedure was again repeated, after which the polymer was dried at 40° C. The resulting modified polyvinyl ethyl urethane acetate polymer was a hard, brittle material which analyzed for 48.1% C, 6.3% H, 7.9% N, and 23.1% $OC_2H_5$. The calculated values were 48.5% C, 6.4% H, 8.1% N, and 26% $OC_2H_5$.

Example 2

A limited reaction was effected by mixing 50 g. of polyvinyl alcohol which had been dried under vacuum over $P_2O_5$ with 200 ml. of dry pyridine. The resulting mixture was heated at 75° C. for 90 minutes with occasional shaking, during which time the polymer particles were swelled by the solvent. The mixture was then cooled to room temperature. Twenty grams of ethyl isocyanoacetate was added and the mixture shaken for a few minutes. Thereafter, the mixture was placed in a closed vessel and tumbled at 50° C. for 16 hours. The product thus obtained was an immobile sludge which was diluted with acetone and filtered. The resulting ethyl acetate urethane of polyvinyl alcohol was in the form of a finely granular product weighing 63 g. The calculated nitrogen content was 3.1% and the product analyzed 2.6% nitrogen.

Example 3

Ten grams of thoroughly dried, water soluble cellulose acetate having an acetyl content of 17% was soaked overnight in 100 ml. of dry pyridine. Thereafter, the mixture was added to 20 g. of ethyl isocyanoacetate. The resulting reaction mixture was then heated on the steam bath and stirred for 2 hours. The light, yellow dope thus obtained was thinned with acetone and filtered. The filtrate was poured slowly into 3 ml. of water with stirring and the resulting white, fibrous precipitate was recovered, pressed, and redissolved in dioxane. The solution was again precipitated in water and the resulting ethyl acetate urethane of the cellulose acetate was washed in fresh water and dried. The product had N=5.9% and $OC_2H_5$=16.6%.

Example 4

A solution of 10 g. of cellulose acetate, having an acetyl content of 32%, in 100 ml. of dry pyridine was mixed with 10 g. of ethyl isocyanoacetate. The resulting solution was heated on the steam bath for 6 hours. After being cooled, the solution was poured into 2.5 l. of cold water containing 100 ml. of glacial acetic acid. The white, fibrous precipitate was pressed out and redissolved in dioxane. The solution was thinned with acetone and precipitated into water to give 12.5 g. of polymeric product having N=3.8% and $OC_2H_5$=8.1%.

Example 5

A solution of 20 g. of cellulose acetate (acetyl content=40.1%) in 150 ml. of dry pyridine was mixed with 15 g. of ethyl isocyanoacetate. The resulting solution was heated on the steam bath for 5.5 hours, thinned with acetone, and then precipitated into 6 l. of water containing 200 ml. of acetic acid. The white, fibrous precipitate was washed, redissolved in a mixture of acetone and dioxane, and again poured slowly into a large volume of water. The resulting fibrous precipitate was thoroughly washed with water and dried at 40° C. to give 21 g. of product having N=1.8%.

Example 6

Urethane carboxylates are prepared in a similar manner with cellulose ethers. Thus, 20 g. of cellulose ethyl ether (ethoxyl content=45.5%) was dissolved in 150 ml. of dry pyridine. To the solution was added 20 g. of ethyl isocyanoacetate and the resulting mixture was heated on the steam bath for 5 hours. The resulting product was thinned with acetone and poured into a large volume of water with stirring. The white, fibrous precipitate thus obtained was thoroughly washed with water and dried at 40° C. to give a product having N=2.6% and ethoxyl=40.9%.

Example 7

Ten grams of cellulose methyl ether (methoxyl content=29.7%) was mixed with 100 g. of dry pyridine and allowed to stand overnight. Thereafter, 20 g. of ethyl isocyanoacetate was added and the mixture was heated on the steam bath for 5 hours. A further 5 g. of ethyl isocyanoacetate was added and the solution heated for an additional 4 hours. The solution was then poured into water and the tan precipitate was redissolved in acetone. This solution was again poured into water and the fibrous precipitate of ethyl acetate urethane cellulose methyl ether was washed thoroughly and dried at 40° C. to give a product having a methoxyl content of 26.2% and a nitrogen content of 4.6%.

Example 8

Twenty grams of a partially acetylated polyvinyl alcohol (43–50 mol percent hydrolyzed polyvinyl acetate) was mixed with 100 ml. of dry pyridine. To this mixture was added 20 g. of ethyl isocyanoacetate and the resulting mixture was heated on the steam bath for 3 hours although a smooth dope was formed within 30 minutes. The product was thinned with acetone and the solution poured into water. The soft precipitate was redissolved in acetone and the solution again poured into water to give a mixed polymeric urethane acetate which was dried at 40° C. and which analyzed for N=4.4%.

Example 9

The processes embodying the invention proceed with equal facility using isocyano-aromatic acid esters. Thus 100 g. (0.44 mol) of dry ethyl cellulose (46.9% ethoxyl) was mixed with 1000 ml. of dry pyridine. The solution was heated on the steam bath and 85.6 g. (0.5 mol) of ethyl 4-isocyanobenzoate was added slowly with efficient stirring. Heating was evolved during the addition and a slightly orange solution was formed. This solution was stirred and heated for 3 hours and then heated without stirring for another 15 hours. It was then diluted with 800 ml. of acetone and precipitated by pouring slowly into 50 l. of highly agitated water. The product thus obtained was a slightly off-white fibrous precipitate which was washed overnight in running water and then air dried. The calculated analysis for the product was C=58.9%, H=7.0%, and N=2.5%. The analysis showed C=59.0%, H=6.7%, and N=3.1%.

Example 10

One hundred grams of dry, incompletely hydrolyzed cellulose acetate (21.0% acetyl) was dissolved in 1 l. of dry pyridine. The solution was heated on the steam bath and 210 g. of ethyl 4-isocyanobenzoate (1:1.1 molar equivalents based on hydroxyl content) was added slowly with stirring. Heat was evolved during this addition and a straw colored solution was formed. This solution was heated and stirred for 2.5 hours and then heated without stirring for 15 hours. The resulting solution was diluted with 800 ml. of acetone and the urethane benzoate of the hydrolyzed cellulose acetate was precipitated by pouring the solution slowly into 50 l. of water with violent agitation. This gave a very fine white fibrous precipitate which was filtered, washed in running water overnight, again filtered and air dried. The calculated analysis was C=57.4%, H=5.1%, and N=4.8%. The analysis found was C=56.3%, H=5.0% and N=4.8%. A sample was further purified by extraction with methanol in a Soxhlet extractor for 16 hours and the product then analyzed for C=56.9%, H=5.1% and N=4.8%.

*Example 11*

Twenty grams (0.088 mol.) of dry ethyl cellulose (46.9% ethoxyl) was dissolved in 500 ml. of dry dioxane. The solution was heated on a steam bath and 12.6 g. (0.066 mol.) of ethyl 4-isocyanobenzoate was added with good stirring. The mixture was stirred and heated for 2 hours and then allowed to stand at room temperature for 16 hours. The resulting solution was poured in a thin stream into 10 l. of highly agitated water to give a light tan fibrous polymer which was washed in running water for 6 hours and then air dried at 40° C. The polymeric product thus obtained weighed 28.9 g. The calculated analysis was C=58.9%, H=7.0%, and N=2.5%. The analysis showed C=56.8%, H=7.2% and N=2.5%.

*Example 12*

Twenty grams (0.075 mol.) of dry partially hydrolyzed cellulose acetate (40.6% acetyl) was dissolved in 400 ml. of dry acetone, 15.2 g. (0.08 mol.) of ethyl 4-isocyanobenzoate was added and the solution was stirred for 1.5 hours. After standing for another 16 hours, the solution was poured in a thin stream into 10 l. of highly agitated cold water. The resulting white fibrous polymer was washed in running water for 6 hours and then air dried at 40° C. The calculated analysis was C=57.4%, H=5.1%, and N=4.8%. The actual analysis gave C=53.0%, H=5.6%, and N=2.6%.

*Example 13*

Twenty grams (0.5 mol.) of polyvinyl alcohol was stirred in 200 ml. of dry dioxane at reflux. Thereafter, 6.45 g. (0.05 mol.) of ethyl isocyanoacetate was added and the mixture stirred and refluxed for 3 hours. After standing at room temperature for 16 hours, the mixture was filtered and the fine, white urethane polymer was washed with fresh, dry dioxane and air dried at 40° C. The analysis showed C=53.7%, H=8.5% and N=1.0%.

*Example 14*

To 100 g. (0.44 mol.) of ethyl cellulose (46.9% ethoxyl), dissolved in 1000 ml. of dry pyridine, was added 50 g. (0.39 mol.) of ethyl isocyanoacetate, and the mixture was heated on a steam bath for 16 hours. The rather dark liquid thus obtained was diluted with 2000 ml. of acetone and poured in a thin stream into 75 l. of highly agitated cold water. The resulting slightly tan fibrous polymer was recovered by filtration, washed in running cold water for 16 hours, and air dried at 40° C. The dry cellulose urethane acetate was dissolved in acetone, reprecipitated in water, and again air dried. The calculated analysis was C=53.9%, H=7.7% and N=2.8%. The actual analysis showed C=53.7%, H=7.7% and N=2.8%.

Similar results are obtained with other hydroxyl containing organic compounds and other isocyano carboxylates and the products thus obtained can be used directly or modified further in accordance with this invention. Thus, for example, it is sometimes desirable to hydrolyze the carbalkoxy groups to the corresponding carboxylic groups. The hydrolysis can be effected in either aqueous acid, such as dilute hydrochloric acid, or in alkaline media without affecting the urethane grouping. Alkaline hydrolysis gives the salt and acid hydrolysis gives the free acid.

*Example 15*

A urethane carboxylate derivative of a cellulose ethyl ether (ethoxyl content 45.5%), prepared as described in the preceding examples by the use of carbethoxy methyl isocyanate, was hydrolyzed to the corresponding carboxylic acid polymer. The urethane carboxylate polymer had a nitrogen content of 2.6% and an ethoxyl content of 40.9%. Seven grams of this urethane carboxylate derivative in the form of a white, fibrous polymer was suspended in 100 ml. of 1 N sodium hydroxide solution, and the mixture was stirred while being heated at 60° C. The polymer after 7 hours was quite swollen, but solution had not occurred. When this mixture was chilled to 5° C. a clear colorless, viscous solution was readily formed. This solution was diluted with a little ice water and poured into an excess of dilute hydrochloric acid. The resulting high swollen precipitate was washed thoroughly with distilled water until the washings were acid free and then dried at 40° C. The resulting urethane acetic acid derivative of the cellulose ethyl ether weighed 6 g. and the product was completely soluble in cold dilute ammonium hydroxide. The nitrogen content was now 2.3% and the carboxyl content was 7.15%. This material, because of its solubility characteristics, made an excellent removable backing for photographic film.

*Example 16*

A 10 g. portion of carbethoxymethyl urethane of polyvinyl alcohol, prepared as in Example 1, was mixed with 100 cc. of a 1 N sodium hydroxide solution and the resulting mixture was heated on a steam bath with stirring. Complete solution was effected in a short time, but the heating was continued for one hour at 90° C. The solution was then cooled and poured into an excess of acetone containing acetic acid in excess of the amount required to neutralize the sodium hydroxide. A white, fibrous, crumbly material was obtained which was filtered off and redissolved in a little distilled water. The aqueous solution was then poured into an excess of ethanol with stirring, and the white crumbly precipitate thus formed was filtered off and extracted continuously with ethanol in a Soxhlet extractor for 16 hours. The resulting sodium salt of the carboxymethyl urethane of polyvinyl alcohol was dried at 40° C. to give a brittle, white polymer which was very readily soluble in water to give clear, colorless, viscous solutions.

*Example 17*

A 10 g. portion of a carbethoxyphenyl urethane of ethyl cellulose (46.9% ethoxyl content), prepared in a manner similar to that described in Example 6, was stirred in 400 ml. of 0.5 N sodium hydroxide at steam bath temperature for 6 hours. It was then heated without stirring for an additional 15.5 hours. The resulting hydrolyzed urethane derivative was recovered by filtration, stirred in 500 ml. of distilled water, and acidified with hydrochloric acid. After standing for 1.5 hours, the polymer was again filtered out and air dried at 40° C. with a yield of 8.3 g. The calculated analysis was C=57.2%, H=6.8%, N=2.7% and COOH=1.94 milliequivalents per g. The actual analysis showed C=58.0%, H=6.7%, N=3.0% and COOH=1.25 milliequivalents per g.

*Example 18*

A polyvinyl butyral composition consisting of 12.9% polyvinyl alcohol and 87.1% polyvinyl butyral was reacted with an excess of methyl p-isocyanobenzoate in the manner described in the preceding examples. A 5 g. portion of the white, fibrous urethane carboxylate polymer was mixed with 50 ml. of an aqueous 1 N sodium hydroxide solution and the resulting mixture was heated on the steam bath under reflux. After 6 hours, the product was filtered off and washed with distilled water. It was suspended in warm (40° C.) dilute hydrochloric acid for a few minutes and then again washed with distilled water. The product was a white, fibrous precipitate which was purified by leaching in fresh water.

*Example 19*

The urethane derivatives can be further modified to the corresponding carbamido urethane polymers. Most of these carbamido derivatives are either water soluble or generally hydrophilic and hence make excellent vehicles for carrying light-sensitive silver halide suspensions. These derivatives also find application as emulsion addenda and as peptizing and ripening agents. A typical carbamido alkyl urethane polymer was prepared in the following manner: A 20 g. portion of a carbethoxymethyl urethane of polyvinyl alcohol (N=7.9%, $OC_2H_5$=23.1%)

in granular form, was mixed with 150 cc. of concentrated ammonium hydroxide solution. The resulting mixture was allowed to stand in a stoppered flask at room temperature. At first the granular particles coalesced to a putty-like mass; but, after 6 hours, a nearly colorless, viscous, clear solution was obtained. This was allowed to stand for 2 more days and then poured into an excess of methanol. The carbamido methyl urethane of polyvinyl alcohol was obtained as a white, fibrous precipitate which was filtered off, leached in fresh methanol, again filtered, and dried. The product was readily soluble in water and had a nitrogen content of 16.8%.

*Example 20*

A 12.5 g. portion of a carbethoxy-methyl urethane of a water soluble cellulose acetate (original acetyl content=17.0%) was mixed with 150 cc. of concentrated ammonium hydroxide solution. The reactants were allowed to stand at room temperature. After 6 hours, solution was nearly complete and after 3 days, a clear nearly colorless dope was formed. This was poured into 2 l. of methanol and the fine, white, fibrous precipitate was filtered off, leached in methanol, leached in ether, and dried. The nitrogen content of the resulting carbamido derivative was 12.1% as compared to a nitrogen content of 5.9% for the carbethoxy methyl urethane polymer.

*Example 21*

A carbethoxy methyl urethane derivative of cellulose acetate (acetyl content 32%) was prepared having a nitrogen content of 3.0%. A 10 g. portion of this product was mixed with 100 cc. of concentrated ammonium hydroxide and the resulting mixture was allowed to stand at room temperature. After standing overnight, the product was an opalescent gelatinous mass which changed little in appearance after standing another 2 days at room temperature. This product was stirred into an excess of methanol and the white, fibrous carbamido polymer thus obtained was washed thoroughly with methanol until the odor of ammonia was gone. After drying at 40° C., 8 g. of a product having a nitrogen content of 5.6% was obtained. This product was soluble in warm water and the solution, on cooling, formed a soft, slightly translucent gel.

*Example 22*

A cellulose acetate polymer (acetyl content=40.1%) was reacted with ethyl isocyanoacetate to give a carbethoxymethyl urethane of cellulose acetate with a nitrogen content of 1.8%. A 20 g. portion of this polymer was mixed with 200 cc. of concentrated ammonium hydroxide solution and the mixture was allowed to stand for 4 days at room temperature. The product was a soft sludge which was poured into an excess of distilled water and thoroughly washed. The highly swollen mass was then dried at 40° C. to give a product having a nitrogen content of 3.5%.

*Example 23*

A cellulose ethyl ether (ethoxyl content=45.5%) was reacted with ethyl isocyanoacetate to give the corresponding urethane having a nitrogen content of 2.6% and an ethoxyl content of 40.9%. A 10 g. portion of this polymer was mixed with 100 cc. of concentrated ammonium hydroxide solution and allowed to stand for 4 days at room temperature. The resulting fibrous product after washing and drying analyzed for N=3.3% and $OC_2H_5$= 39.0%.

*Example 24*

A polyvinyl acetal composition containing 35.7% of polyvinyl alcohol, 0.8% of polyvinyl acetate, and 63.5% of polyvinyl acetal was reacted with an excess of ethyl isocyanoacetate in pyridine solution to form the urethane carboxylate derivative. A 50 g. portion of the fibrous, water insoluble product was steeped in 400 cc. of concentrated ammonium hydroxide solution and allowed to stand at room temperature in a closed vessel. In 3 days, a smooth nearly colorless solution was formed. After standing for another day, the solution was poured in a thin stream into a large excess of acetone with stirring. The product was a white, fibrous polymer which was leached in fresh acetone and then in ether and dried.

*Example 25*

To a solution of 5 g. of a carbethoxymethyl urethane of polyvinyl alcohol in 10 cc. of piperidine was added 10 cc. of water. The solution was heated at 50° C. for 4 hours and then poured into ethanol containing acetic acid in excess of that required to neutralize the piperidine. The precipitate which formed was redissolved in water and the aqueous solution was made acid by the addition of a trace of concentrated hydrochloric acid. The soft precipitate which formed readily redissolved when a little alcohol was added. This solution was then poured into an excess of acetone and a white, fibrous carbamido product was obtained which was dried and found to contain N=9.0% and $OC_2H_5$=less than 1%.

*Example 26*

A mixture was prepared consisting of 5 g. of carbethoxymethyl urethane of polyvinyl alcohol, 15 cc. of ethylene glycol, and 10 cc. of morpholine. This mixture was stirred at room temperature and, after some time, a viscous solution was formed. After 3 days, the product was diluted with water and the solution poured into alcohol containing excess acetic acid. The white, fibrous precipitate was redissolved in water and the solution was acidified by the addition of a trace of concentrated hydrochloric acid. The soft precipitate which formed was redissolved by the addition of a small amount of alcohol and the solution was then poured into excess acetone. The white, fibrous precipitate, after leaching with acetone and ether and drying at 40° C. had a nitrogen content of 11.6% and an ethoxyl content of 0.6%.

*Example 27*

A 5 g. portion of a carbethoxymethyl urethane of polyvinyl alcohol (N=7.9%, $OC_2H_5$=23.1%) was refluxed on a steam bath with 30 cc. of n-butylamine for 22 hours. The resulting solution was poured into water containing an excess of acetic acid. The soft, fibrous precipitate was leached in fresh water, redissolved in acetone, and then precipitated into dilute hydrochloric acid. The precipitate was once more dissolved in the acetone and precipitated into distilled water. The resulting polymer had a nitrogen content of 13.5% and an ethoxyl content of less than 1%.

Other modified polymers are prepared in accordance with this invention as described hereinabove. The variety of products thus obtainable makes possible the preparation of polymeric materials of almost any desired solubility characteristics. As a consequence, modified cellulose polymers and polyvinyl polymers having markedly changed properties can be prepared simply and effectively. Since most of the modified polymers formed can be precipitated as a fibrous precipitate by addition to a suitable solvent, the preparation of such modified polymers in a continuous fashion is possible on a large scale. The products are, of course, useful for a great variety of applications, particularly in the field of emulsions where hydrophilic materials are desirable.

Although the invention has been described in considerable detail with particular reference to certain preferred embodiments thereof, it will be understood that variations and modifications can be effected within the spirit and scope of the invention as described hereinabove and as defined in the appended claims.

We claim:

1. The method which comprises reacting a polymeric organic compound containing a plurality of functional hydroxyl groups with a carbalkoxy isocyanate and thereby forming a polymeric carbalkoxy urethane, and reacting said polymeric carbalkoxy urethane with a nitrogen compound having an active hydrogen and being selected from the class consisting of ammonia, primary amines and secondary amines and thereby forming a polymeric carbamido urethane.

2. The method which comprises reacting a polymeric organic compound containing a plurality of functional hydroxyl groups with an alkyl isocyanoacetate and thereby forming a urethane alkyl acetate, and reacting said urethane alkyl acetate with a nitrogen compound containing an active hydrogen and being selected from the group consisting of ammonia, primary amines and secondary amines and thereby forming the corresponding urethane acetamide.

3. The method which comprises reacting a polymeric organic compound containing a plurality of functional hydroxyl groups with an alkyl isocyanobenzoate and thereby forming a urethane alkyl benzoate, and reacting said urethane alkyl benzoate with a nitrogenous compound containing an active hydrogen and being selected from the group consisting of ammonia, primary amines and secondary amines and thereby forming the corresponding benzoamido urethane.

4. The method which comprises reacting a hydroxyl-containing cellulose compound with an alkyl isocyanocarboxylate and thereby forming a cellulosic urethane carboxylate, and reacting said cellulosic urethane carboxylate with a nitrogenous compound containing an active hydrogen and being selected from the group consisting of ammonia, primary amines, and secondary amines, and thereby forming the corresponding cellulosic carbamido urethane.

5. The method which comprises reacting a hydroxyl-containing polyvinyl polymer with an alkyl isocyanocarboxylate and thereby forming a polyvinyl urethane carboxylate, and reacting said polyvinyl urethane carboxylate with a nitrogenous compound containing an active hydrogen and selected from the group consisting of ammonia, primary amines, and secondary amines, and thereby forming the corresponding polyvinyl carbamido urethane.

6. The method which comprises reacting a hydroxyl-containing cellulose compound with an alkyl isocyanoacetate and thereby forming a cellulosic urethane alkyl acetate, and reacting said cellulosic urethane alkyl acetate with a nitrogenous compound containing an active hydrogen and selected from the group consisting of ammonia, primary amines, and secondary amines, and thereby forming the corresponding cellulosic acetamido urethane.

7. The method which comprises reacting a hydroxyl-containing cellulose compound with an alkyl isocyanobenzoate, and reacting the resulting product with a member of the group consisting of ammonia, primary amines, and secondary amines, and thereby forming a cellulosic benzoamido urethane.

8. A derivative of a hydroxyl-containing polymer having at least a portion of the positions normally occupied by functional hydroxyl groups occupied by carbamido urethane groups, said polymer being the product obtained according to claim 1.

References Cited in the file of this patent

UNITED STATES PATENTS

| | | |
|---|---|---|
| 2,268,586 | Gilman | Jan. 6, 1942 |
| 2,303,363 | Kaase et al. | Dec. 1, 1942 |
| 2,466,404 | Fowler | Apr. 5, 1949 |

OTHER REFERENCES

Lengfeld et al.: American Chemical Journal, vol. 15, 1893, pages 504 and 510–514.

Fischer: Berichte Deut. Chem. Gesel., vol. 36, 1903, pages 2094 to 2098.

Richter-Spielmann: Organic Chemistry, vol. I; received U. S. Patent Office, October 31, 1925, pages 435 to 437, 461 and 462.

Siefkin: Liebig's Annalen der Chemie, vol. 562, pages 76, 80, 105, 107 (1949).